United States Patent [19]
Watanabe et al.

[11] Patent Number: 4,479,143
[45] Date of Patent: Oct. 23, 1984

[54] COLOR IMAGING ARRAY AND COLOR IMAGING DEVICE

[75] Inventors: Takashi Watanabe; Shigehiro Miyatake, both of Nara, Japan

[73] Assignee: Sharp Kabushiki Kaisha, Osaka, Japan

[21] Appl. No.: 331,090

[22] Filed: Dec. 15, 1981

[30] Foreign Application Priority Data

Dec. 16, 1980 [JP] Japan .................. 55-181152[U]

[51] Int. Cl.³ .............................................. H04N 9/07
[52] U.S. Cl. ...................................................... 358/44
[58] Field of Search .................. 358/56, 59, 50, 52, 358/64, 44, 48, 212, 43; 313/461, 470, 471, 472; 340/366 CA, 366 E

[56] References Cited

U.S. PATENT DOCUMENTS

| | | | |
|---|---|---|---|
| 3,971,065 | 3/1975 | Bayer | 358/44 |
| 4,047,203 | 9/1977 | Dillon | 358/44 |
| 4,064,532 | 12/1977 | Yamanaka | 358/44 |
| 4,121,244 | 10/1978 | Nakabe | 358/44 |
| 4,200,883 | 4/1980 | Yamanaka | 358/44 |
| 4,329,709 | 5/1982 | Masuda | 358/44 |

FOREIGN PATENT DOCUMENTS 2285773 9/1974 France .................. 358/44

OTHER PUBLICATIONS

Single-Chip Solid State Color Video Camera System, Fujimoto, et al., Report of the Institute of Television Engineers of Japan, Tebs 64-3 pp. 59 to 64, Aug. 29, 1980.
Frequency Interleaving System Color Camera Using one CCD, OOI, et al., 1982 National Education Record of the Institute of Television Engineers of Japan, pp. 95-96.

Primary Examiner—Tommy P. Chin
Attorney, Agent, or Firm—Birch, Stewart, Kolasch & Birch

[57] ABSTRACT

A color imaging array including green, red and blue sensor elements defined by a single solid-state CCD. The green sensor elements are located at every other element positions along horizontal and vertical directions, the red sensor element are located at element positions between the green elements in adjacent horizontal lines in pairs which occur every other pair of adjacent horizontal lines, and the blue elements are located at the remaining element positions. This arrangement of color imaging array provides red and blue sensor elements in the same sampling rate as the green sensor elements, when horizontal alignment is considered. Thus, this arrangement provides an improved color resolution in horizontal direction.

8 Claims, 11 Drawing Figures

Fig. 1a PRIOR ART
| G | R | G | R |
|---|---|---|---|
| B | G | B | G |
| G | R | G | R |
| B | G | B | G |
Fig. 1b PRIOR ART
| G | R | G | B |
|---|---|---|---|
| R | G | B | G |
| G | R | G | B |
| R | G | B | G |
Fig. 2 PRIOR ART
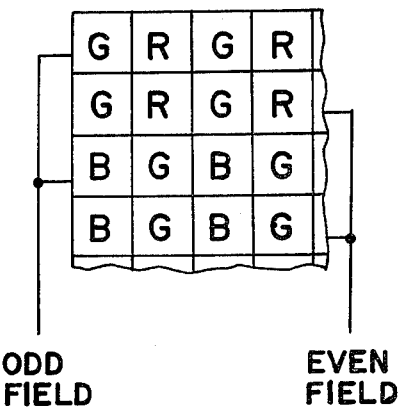
ODD FIELD — EVEN FIELD
Fig. 3
| | | | | | | | |
|---|---|---|---|---|---|---|---|
| (1) | G | R | G | R | G | R | G | R |
| (2) | R | G | R | G | R | G | R | G |
| (3) | G | B | G | B | G | B | G | B |
| (4) | B | G | B | G | B | G | B | G |
| (5) | G | R | G | R | G | R | G | R |
| (6) | R | G | R | G | R | G | R | G |
| (7) | G | B | G | B | G | B | G | B |
| (8) | B | G | B | G | B | G | B | G |
Fig. 4
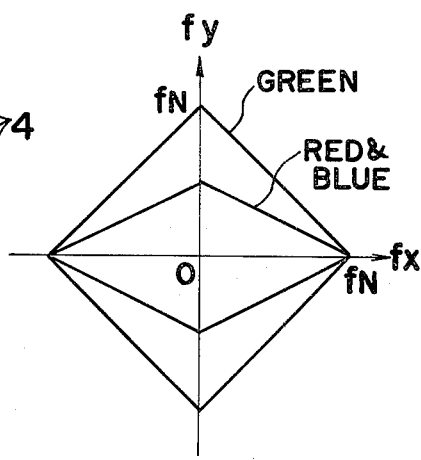

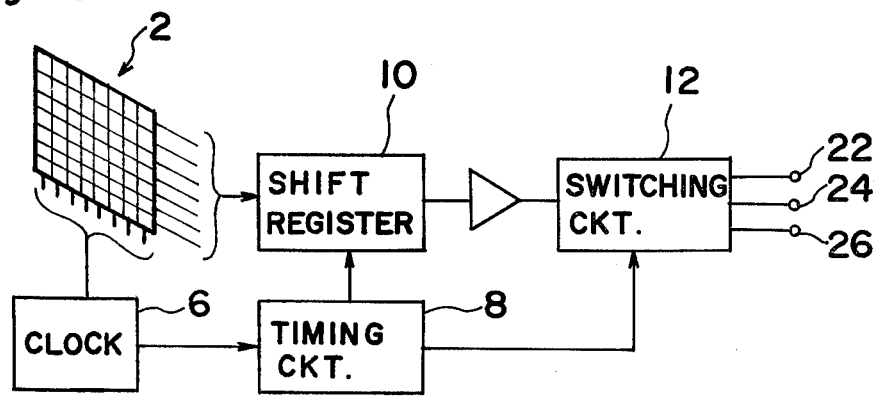
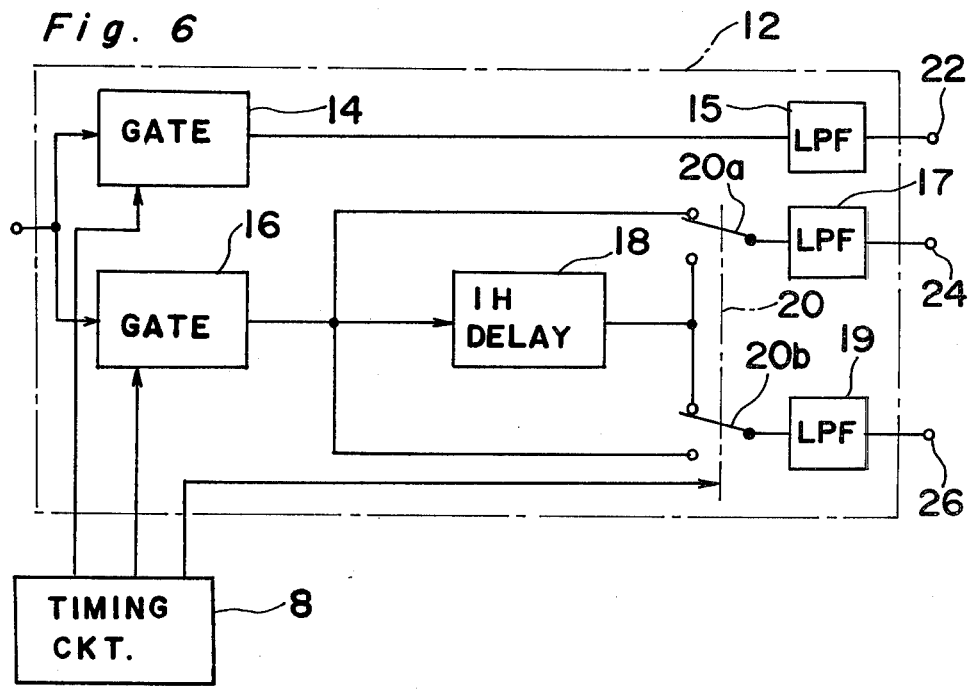

COLOR IMAGING ARRAY AND COLOR IMAGING DEVICE

BACKGROUND OF THE INVENTION

1. Field of the Invention

The present invention relates to an improvement of a color imaging array and a color imaging device for use, e.g., in a color video camera.

2. Description of Background Art

The color video camera picks up an image of a subject and produces a video signal comprising three different color signals, for example, green, red and blue color signals. To this end, the image picked up by the video camera must be analyzed in three different colors. One approach to this is to employ a beam-splitting optical arrangement, for splitting the beam into three separate beams with three image sensors provided in the paths of the beams for sensing the respective colors.

The above arrangement, however, accompanies high manufacturing cost for three sensors and a beam-splitting optical, arrangement. Furthermore, it results in a bulky size of the unit.

Then, there has been proposed a single-sensor system which uses one CCD image sensor with an attached color mosaic filter to color encode the image. When compared with a black-and-white imaging system, such a single-sensor system for sensing the color image has less resolution.

To improve the color resolution, many approaches have been made. For example, U.S. Pat. No. 3,971,065 to Bayer teaches a color imaging array shown in FIG. 1a in which green filters are located at every other element positions along horizontal and vertical directions, and red and blue filters are located in alternate horizontal lines between elements with green filter. When this color imaging array is used in combination with a signal processing device designed for effecting a so-called interlaced readout, that is a readout effected in the order of odd horizontal lines from the ones with younger line number and then the even horizontal lines from the ones with younger line number, the odd rows in FIG. 1a, consisting of only red and green samples, are read out in sequence and displayed on the odd video field, followed by a display of green and blue elements alone from the even rows on the succeeding even field. This results in a yellow-cyan hue-flicker. Although this hue-flicker can be eliminated by employing a delay or memory means which delays each of red and blue signals by the time interval of one field for compensating the lacking color signal, for example, compensating the blue signal in the odd video field, the employment of one field memory results in high manufacturing cost. The Bayer's color imaging array is also discussed in IEEE JOURNAL OF SOLID-STATE CIRCUITS, VOL. SC-13, NO. 1, FEBRUARY 1978 under title "Color Imaging System Using a Single CCD Area Array".

Another color imaging array such as shown in FIG. 1b is disclosed in Japanese Laid Open patent application (Tokkaisho) No. 55-55686 published Apr. 23, 1980. As apparent from FIG. 1b, the green filters are disposed in a manner of checkerboard, red filters are disposed in adjacent vertical lines in pairs which occur every other pair of vertical lines, and green filters are disposed in the remaining element positions. According to this arrangement, the red filters, when considered in the horizontal direction, are spaced 4 picture-element positions, and therefore, the resolution of red in the horizontal direction is poor. The same can be said to blue filters. This results in narrow Nyquist domain in horizontal direction.

A further color imaging array is shown in FIG. 2 in which the green, red and blue filters are in pairs in vertical direction, and such pairs of green, red and blue filters are disposed in a similar alignment as that shown in FIG. 1a. In other words, the first two rows in FIG. 2 correspond to the first row in FIG. 1a, and the next two rows in FIG. 2 correspond to the second row in FIG. 1a. When this arrangement of FIG. 2 is coupled with a signal processing device producing interlaced readout, the video signal of green, red and blue will be included in each of odd and even fields, and therefore, this arrangement will not result in any hue-flicker. However, the arrangement of FIG. 2 has such a disadvantage that each picture element occupies twice the area of that necessary in the imaging array of FIG. 1a or 1b. Therefore, when compared with the color imaging array of FIG. 1a or 1b, the color imaging array of FIG. 2 has a poor resolution.

SUMMARY OF THE INVENTION

The present invention has been developed with a view to substantially eliminating the above described disadvantages and inconveniences and has for its essential object to provide a color imaging array which has an improved color resolution particularly in a horizontal direction.

It is another object of the present invention to provide a color imaging array of the above described type which is simple in construction and can readily be manufactured.

It is a further object of the present invention to provide a color imaging device which employs the improved color imaging array.

In accomplishing these and other objects of the present invention, a color imaging array according to the present invention comprises, first type of elements sensitive to lights in a first region of spectrum, second type of elements sensitive to lights in a second region of spectrum, and third type of elements sensitive to lights in a third region of spectrum. The three types of elements are aligned horizontally and vertically within a predetermined plane such that the first type of elements occupy every other element positions along both of the horizontal and vertical directions, the second type of elements occupy element positions between the first type of elements in adjacent horizontal lines in pairs which occur every other pair of adjacent horizontal lines, and the third type of elements occupy the remaining element positions.

When the color imaging array according to the present invention is employed in an interlaced readout device, the resolution of lights in the second and third spectral regions in the horizontal direction can be improved.

Furthermore, when 1H line delay circuit is employed in association with the interlaced readout device, the signals corresponding to second and third spectral regions can be simply compensated within each field.

BRIEF DESCRIPTION OF THE DRAWINGS

These and other objects and features of the present invention will become apparent from the following description taken in conjunction with preferred embodiment thereof with reference to the accompanying drawings, in which:

FIGS. 1a, 1b and 2 are diagrams partly showing the color imaging array according to the prior art;

FIG. 3 is a diagram partly showing a color imaging array according to the present invention;

FIG. 4 is a graph showing Nyquist domain of the color imaging array of FIG. 3;

FIG. 5 is a block diagram of a color imaging device according to the present invention;

FIG. 6 is a detailed block diagram of a switching circuit shown in FIG. 5;

FIGS. 8a, 8b and 8c are diagrams similar to FIG. 3, but particularly showing modifications.

DETAILED DESCRIPTION OF THE INVENTION

Figure 7:
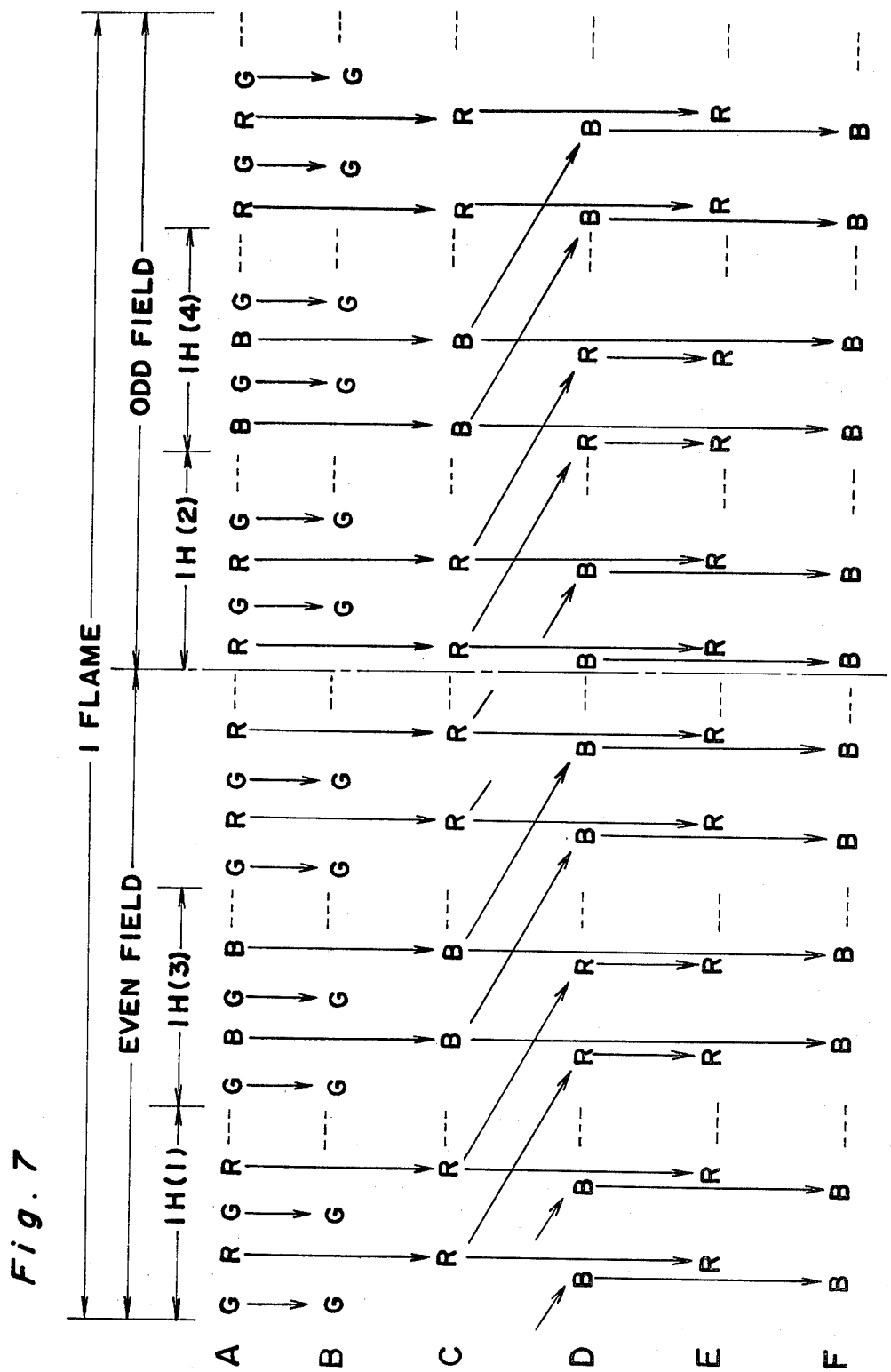
FIG. 7 is a time table showing the sequence of color signals appearing at major points in the block diagram of FIG. 6.

Referring to FIG. 3, there is shown a diagrammatic partial view of a color imaging array 2 formed by a single layer of a solid-state substrate, such as a silicon semiconductor substrate. The color imaging array 2 includes a plurality of sensor elements 4 which are aligned in two orthogonal directions (e.g., horizontal and vertical) as in a matrix. Each of the sensor elements is superposed with a filter for selectively transmitting light beams having a particular wavelength. More particularly, the sensor elements 4 denoted by a reference character "G" are superposed with a filter selectively transmissive to lights in the green region of spectrum (hereinafter referred to as a green filter), the sensor elements 4 denoted by a reference character "R" are superposed with a filter selectively transmissive to lights in the red region of spectrum (hereinafter referred to as a red filter) and the sensor elements 4 denoted by a reference character "B" are superposed with a filter selectively transmissive to lights in the blue region of spectrum (hereinafter referred to as a blue filter). The sensor element 4 superposed with the green filter is referred to as a green sensor element. Similarly, the sensor elements 4 superposed with red and blue filters are referred to as red and blue sensor elements, respectively.

Since human eyes have a greater resolving power to the color green than red or blue, the green sensor elements G are disposed in higher density than the other sensor elements R and B. More particularly, the green sensor elements G occupy every other element position along both of the two orthogonal directions of the array as in a checkerboard, whereas the red sensor elements R occupy element positions between the green sensor elements in adjacent horizontal lines in pairs which occur every other pair of adjacent horizontal lines, and the blue sensor elements B occupy the remaining element positions.

Referring to FIG. 4, there is shown a resolvable region of spatial frequencies for the green, red and blue colors. In the graph, fN designates Nyquist limit of the entire imaging array. As understood from FIG. 4, the usable region of the red and blue extends horizontally as far as the Nyquist limit, showing that the resolving power of red and blue is as excellent as green.

Referring to FIG. 5, a color imaging device is shown in a simplified manner. The color imaging array 2 is coupled with a clock 6 and a shift register 10 for transmitting image information from individual rows (horizontal lines) of the array to the shift register 10 relative to the received light. A timing circuit 8 controlled by the clock 6 is connected to the shift register 10 for driving the shift register 10 in an interlaced readout manner. More particularly, by the timing circuit 8, the shift register 10 produces serially aligned image information in the order of odd lines and even lines. For example, the shift register 10 reads out image information in the order of 1st horizontal line, 3rd horizontal line, 5th horizontal line, . . . , and then 2nd horizontal line, 4th horizontal line, 6th horizontal line, . . . . This operation is repeated again and again, and as will be understood to those skilled in the art, the image information from the odd numbered horizontal lines defines a video signal of odd field and from the even numbered horizontal lines, a video signal of even field. In FIG. 7 row A, there is shown an alignment of color video signals for 1 frame. Although there are only 4 color signals shown in each horizontal section (1H), it is understood to those skilled in the art that each line contains many more signals. In FIG. 7, the number given in parenthesis after each "1H" designates the horizontal line number shown in FIG. 3.

The color imaging device shown in FIG. 5 further includes a switching network 12 which separates the color signal sequence to a usable form, for example, to parallel green, red and blue video signals. The separated video signals are produced from output terminals 22, 24 and 26.

Referring to FIG. 6, there is shown a detailed block diagram of the switching network 12 which includes gates 14 and 16, 1H delay circuit 18 and switching device 20. Each of the gates 14 and 16 is defined by a sampling circuit and is connected to the shift register 10. The gates 14 and 16 are operated alternately to separate green color signals and other color signals (i.e., red and blue color signals). Therefore, the gate 14 produces a series of green color signals, as shown in row B in FIG. 7, and these green color signals are fed through a low pass filter 15 and are taken out from the terminal 22. The gate 16 produces a series of red color signals and then a series of blue color signals, alternately by the lines, as shown in row C in FIG. 7. The delay circuit 18 delays the signal from the gate 16 by 1H, and accordingly, the delay circuit 18 produces a delayed color signals, as shown in row D in FIG. 7.

The switching device 20 includes a pair of contacts 20a and 20b which are connected to the terminals 24 and 26, respectively, through low pass filters 17 and 19. Each of the contacts 20a and 20b alternately change their position in a synchronized manner with horizontal line signal between a first contact position in which the contact 20a or 20b is connected to the gate 16 and a second contact position in which the contact 20a or 20b is connected to the delay circuit 18. Since the contacts 20a and 20b are operated in opposite relation to each other, the first contact 20a makes the first and second contact positions during the second contact 20b making the second and first contact positions, respectively. Thus, the terminal 24 produces only the red color signals, as shown in row E in FIG. 7, and the terminal 26 produces only the blue color signals, as shown in row F in FIG. 7. It is to be noted that the gates 14 and 16 and the switching device 20 are controlled by the timing circuit 8.

As understood from the foregoings, the red color signals directly obtained from the gate 16 through the contact 20a are compensated by the red color signals obtained from the delay circuit 18, and accordingly, the chrominance of red can be improved. The same can be said to the blue color signals.

According to the arrangement of green, red and blue sensor elements described above in connection with FIG. 3, since the green sensor elements, which is particularly sensitive to luminance, occupy half of the element positions and disposed in a manner of a checkerboard, the resolution of the image from the view point of luminance can be effected with high quality.

Furthermore, since the red and blue sensor elements are disposed, when one field is considered, in every other line, the color video signals of red and blue can be obtained alternately in line sequence. Therefore, by employing the 1H delay circuit, it is possible to obtain the green, red and blue signals with the same sampling frequency. Thus, it can be said that, when the imaging device is producing interlaced readout, the color imaging array according to the present invention will not result in hue-flicker.

Also, since the red and blue sensor elements are disposed alternately in adjacent horizontal lines in pairs, the resolution of red and blue can be effected with high quality in the horizontal direction.

It is to be noted that the sensor elements 4, which have been described as superposed with green, red and blue filters, can be superposed with color filters having complementary relation. For example, as shown in FIG. 8a, the red and blue filters can be replaced with yellow and cyan filters, which are denoted as "Ye" and "Cy", respectively. Another arrangement is shown in FIG. 8b in which the green filters are replaced with white filters denoted as "W". Yet another arrangement is shown in FIG. 8c in which the green, red and blue filters are replaced with white, yellow and cyan filters, respectively.

It is also to be noted that the color imaging device according to the present invention can be formed by solid-state image sensing device, such as MOS chip, CID chip, CCD chip or BBD chip.

Although the present invention has been fully described with reference to the accompanying drawings, many modifications and variations thereof will now be apparent to those skilled in the art, and the scope of the present invention is therefore to be limited not by the details of the preferred embodiment described above, but only by the terms of appended claims.

We claim:

1. A color imaging device comprising:
   (a) a color imaging array comprising:
      (i) first type of elements sensitive to lights in a first region of spectrum;
      (ii) second type of elements sensitive to lights in a second region of spectrum; and
      (iii) third type of elements sensitive to lights in a third region of spectrum wherein
      said three type of elements are aligned horizontally and vertically within a predetermined plane such that said first type of elements occupy every other element positions along both the horizontal and vertical directions, said second type of elements occupy element positions between the first type of elements in adjacent horizontal lines in pairs which occur every other pair of adjacent horizontal lines, and said third type of elements occupy remaining element positions, said first, second and third type of elements adapted for producing first, second and third color signals, respectively;
   (b) shift register means connected to said color imaging array for sequentially shifting said color signals in the order of color signals in odd numbered horizontal lines from younger one and then color signals in even numbered horizontal lines from younger one, and for producing a serial color signal in said order;
   (c) separating means connected to said shift register means for separating said serial color signal into three parallel color signals of first color signal, second color signal and third color signal, said separating means comprising:
      (i) first gate means for gating alternate color signal of said serial color signal, said first gate means producing first color signal;
      (ii) second gate means for gating alternate color signal of said serial color signal in opposite relation to said first gate means, said second gate means producing a combined signal of second and third color signals;
      (iii) delay means for delaying said combined signal by one horizontal line period; and
      (iv) switching means having first and second contacts operatively provided such that each alternately changes its position in a synchronized manner with horizontal line period interval between a first position in which the contact is connected to said second gate and a second position in which the contact is connected to said delay means, said first and second contacts being operated in opposite relation to each other thereby said first contact producing second color signal and said second contact producing third color signal.

2. A color imaging device as claimed in claim 1, wherein said first and second gate means are defined by first and second sampling circuits, respectively.

3. A color imaging device as claimed in claim 2, wherein said first sampling circuit is connected to a first low pass filter.

4. A color imaging device as claimed in claim 3, wherein said first and second contacts are coupled with second and third low pass filters, respectively.

5. A color imaging array according to claim 1, wherein said first, second and third types of elements are sensitive to green, red and blue lights, respectively.

6. A color imaging array according to claim 1, wherein said first, second and third types of elements are sensitive to white, yellow and cyan lights, respectively.

7. A color imaging array according to claim 1, wherein said first, second and third types of elements are sensitive to green, yellow and cyan lights, respectively.

8. A color imaging array according to claim 1, wherein said first, second and third types of elements are sensitive to white, red and blue lights, respectively.

* * * * *